Oct. 15, 1963    O. A. KERSHNER    3,106,990
DISC BRAKE
Filed Jan. 23, 1961    3 Sheets-Sheet 1

INVENTOR.
Osborn A. Kershner
BY
Olson & Trexler
Attys.

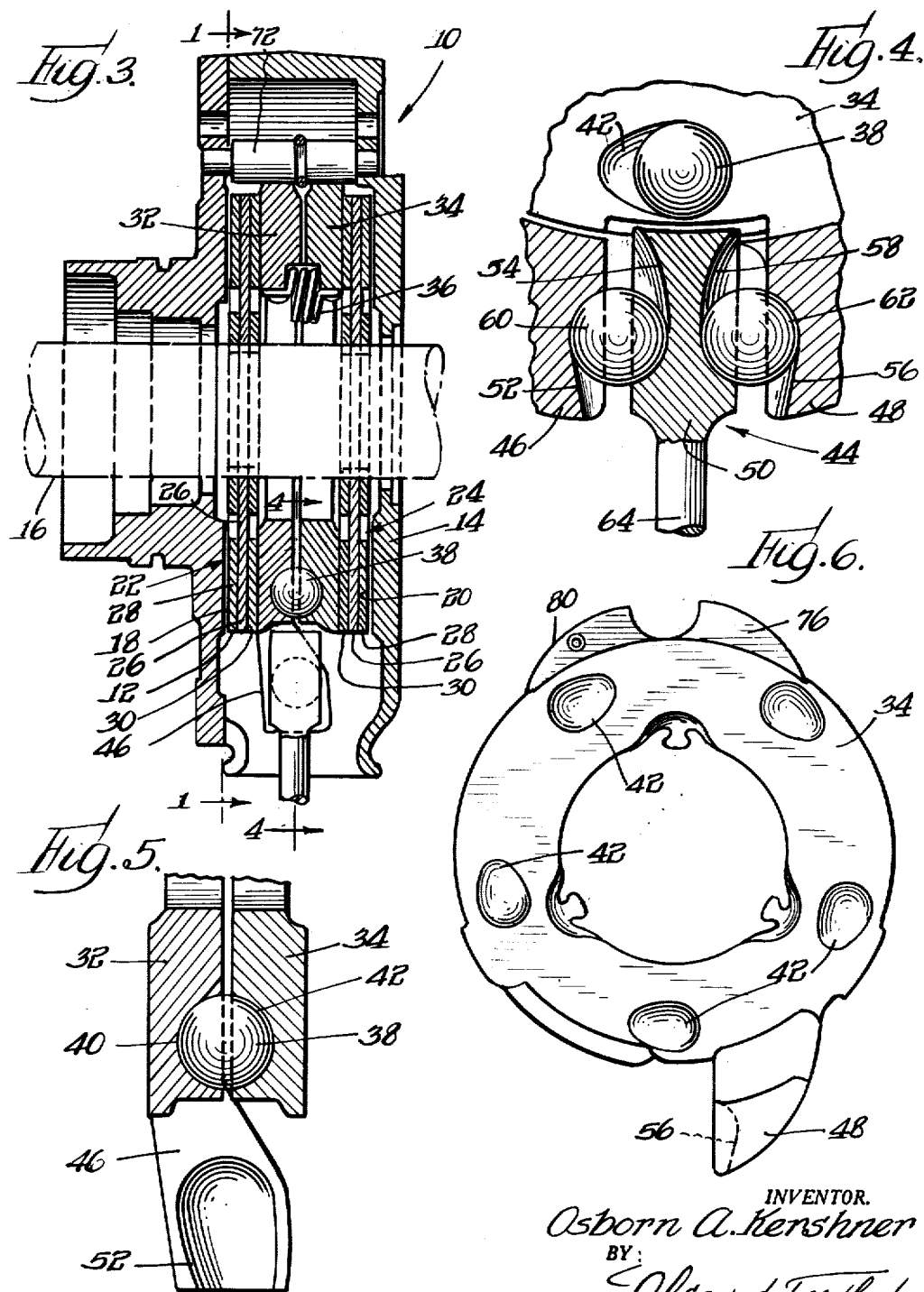

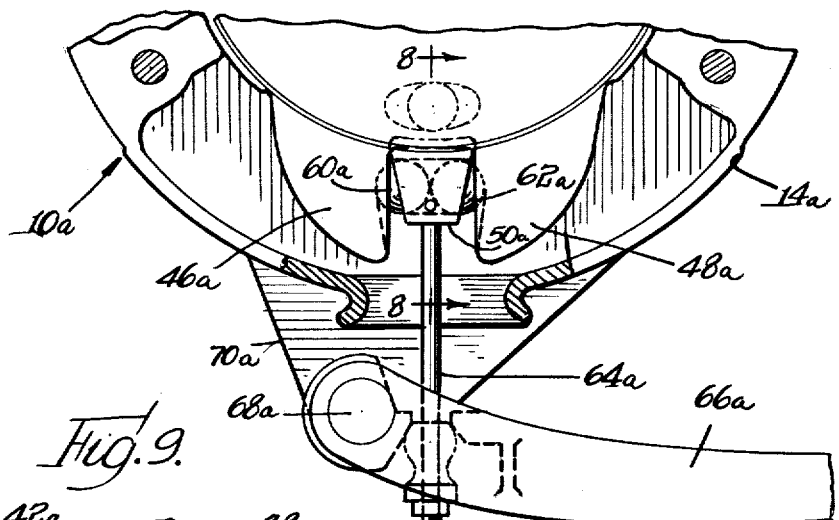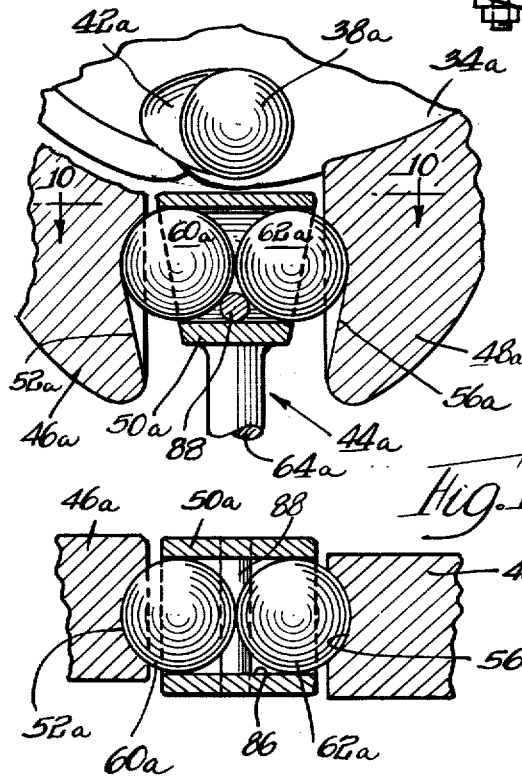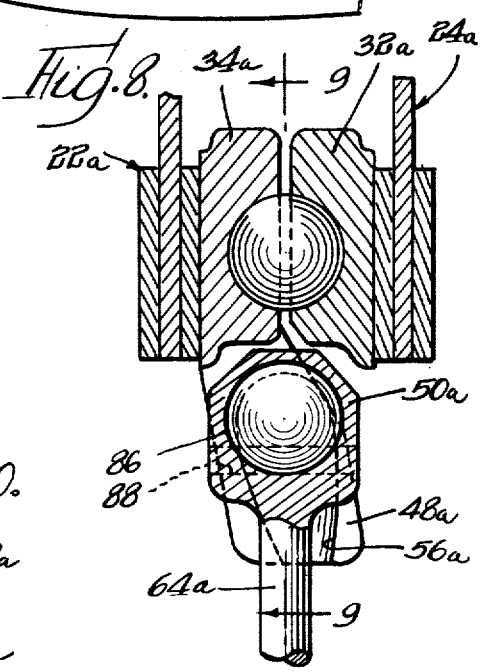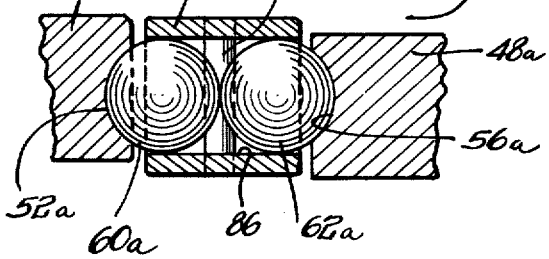

United States Patent Office 3,106,990
Patented Oct. 15, 1963

1

3,106,990
DISC BRAKE
Osborn A. Kershner, St. Joseph, Mich., assignor, by mesne assignments, to Lambert Brake Corporation, St. Joseph, Mich., a corporation of Michigan
Filed Jan. 23, 1961, Ser. No. 84,132
5 Claims. (Cl. 188—72)

The present invention relates to a novel brake structure and more specifically to a novel disc-type brake structure.

Brake structures of the type contemplated herein are useable in a wide variety of installations in which there is a shaft or other rotatable part to be controlled. By way of example only, it is noted that brake structures of the type contemplated herein are adapted to be used in vehicles such as automobiles, trucks, tractors and the like.

Disc-type brake structures have heretofore been proposed which include a pair of friction discs disposed at opposite sides of a pair of actuating discs, and means for spreading the actuating discs apart for forcing the friction discs against brake surfaces. Different mechanisms including linkages and wedged devices have been proposed for controlling the actuating discs, and certain of such heretofore proposed mechanisms have represented substantial advances and have performed satisfactorily in many installations. However, the present invention contemplates the provision of a novel mechanism which incorporates significant structural and functional improvements.

An important object of the present invention is to provide a novel disc-type brake structure which is more efficient in operation and is more economical to produce and which at the same time is capable of accommodating higher working loads.

A more specific object of the present invention is to provide a novel disc-type brake structure having means for energizing the actuating discs constructed so as substantially to eliminate sliding friction between parts thereof for promoting easier and smoother operation of the brake structure.

A further specific object of the present invention is to provide novel disc brake structure of the above described type wherein means for energizing the actuating discs is constructed so that the mechanical advantages obtained therein may be controlled in a predetermined manner throughout the operation of the brake structure.

Other objects and advantages of the present invention will become apparent from the following description and the accompanying drawings wherein:

FIG. 3 is a partial sectional view taken along line 3—3 in FIG. 1;

FIG. 4 is an enlarged fragmentary and partial sectional view taken generally along line 4—4 in FIG. 3;

FIG. 5 is a fragmentary sectional view taken generally along line 5—5 in FIG. 4;

FIG. 6 is an elevational view showing one of the actuating discs incorporated in the brake structure of the present invention;

FIG. 7 is a fragmentary sectional view similar to FIG. 1 but showing a modified form of the present invention;

FIG. 8 is an enlarged fragmentary partial sectional view taken along line 8—8 in FIG. 7;

FIG. 9 is a fragmentary sectional view taken along line 9—9 in FIG. 8; and

FIG. 10 is a fragmentary sectional view taken along line 10—10 in FIG. 9.

Referring now more specifically to the drawings where-

Figure 1:
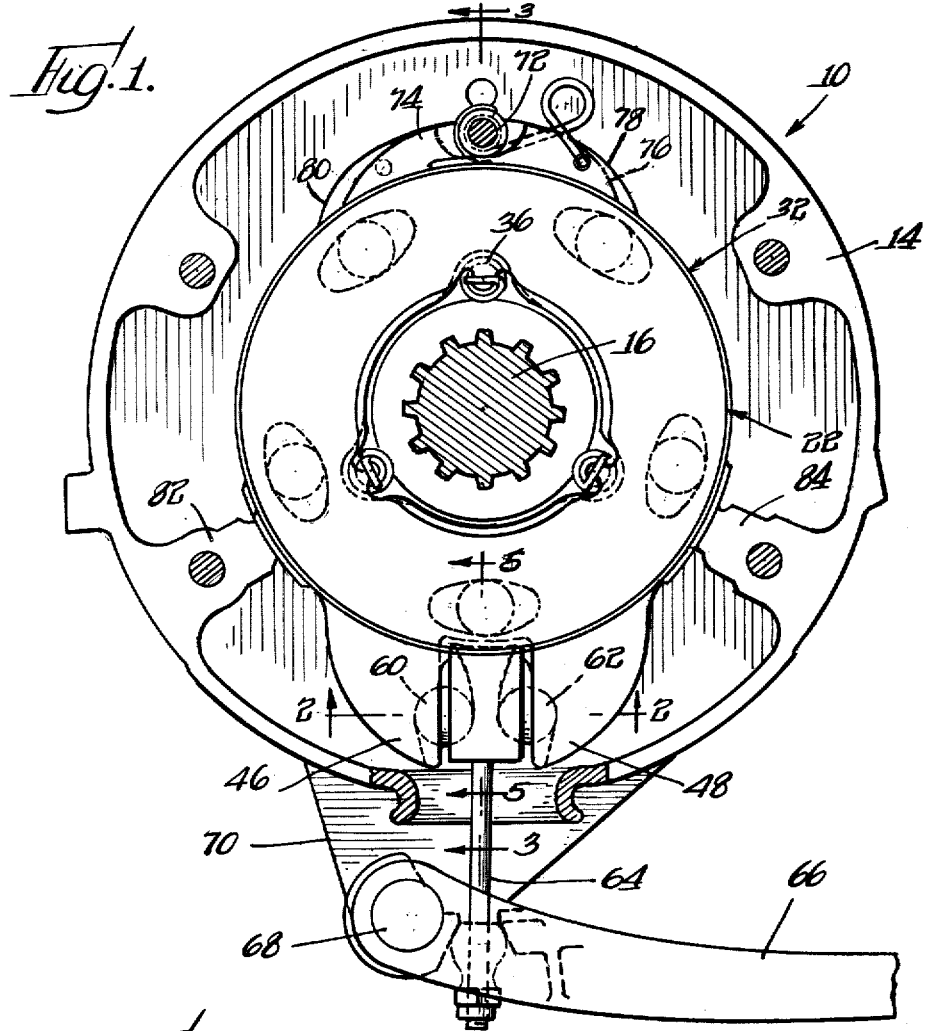
FIG. 1 is a partial sectional view showing a brake structure incorporating features of the present invention and taken generally along line 1—1 in FIG. 3.
Figure 2:
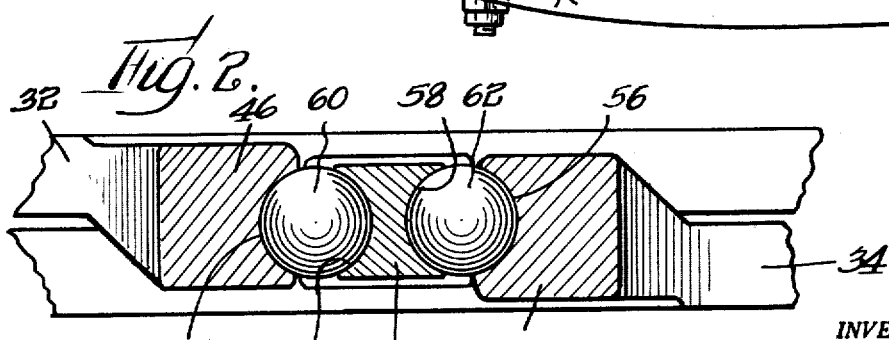
FIG. 2 is an enlarged fragmentary sectional view taken along line 2—2 in FIG. 1.

2 in like parts are designated by the same numerals throughout the various figures, a brake assembly 10 incorporating features of the present invention is shown in FIGS. 1 and 3. The brake structure or assembly 10 includes complementary housing members 12 and 14 suitably joined together and fixed to a portion of the apparatus with which the brake structure is assembled such as the frame of a tractor, not shown. A rotatable shaft 16 which is to be controlled extends into the housing members in the manner shown.

The housing members 12 and 14 respectively present inwardly and oppositely facing friction surfaces 18 and 20 which are engageable with outwardly facing sides of substantially identical friction disc assemblies 22 and 24. Each of the friction disc assemblies comprises a central metal disc 26 having annular bodies 28 and 30 of friction material secured to its opposite sides. The central disc 26 of each of the friction disc assemblies 22 and 24 is provided with a splined or other suitable connection with the shaft 16 so that the friction disc assemblies are rotatable with the shaft and axially shiftable relative to the shaft.

Substantially identical but oppositely disposed actuating discs 32 and 34 are disposed between the friction disc assemblies 22 and 24 for pressing the friction disc assemblies against the friction or brake surfaces 18 and 20 when the brake structure is energized in the manner described in detail below. The actuating discs are normally retained in the retracted relatively closely spaced positions shown in FIGS. 1 and 3 by a plurality of springs 36 connected between suitable ears on the discs.

In order to spread the actuating discs 32 and 34 apart and thereby energize the brake structure, means constructed in accordance with features of the present invention and described in detail below is provided for rotating the actuating discs relative to each other, and ball elements 38 are disposed between pairs of identical but oppositely disposed cam surfaces or ball seats 40 and 42 in discs 32 and 34 respectively. The structure is such that when the actuating discs are rotated relative to each other the balls 38 will ride up on the inclined cam seats 40 and 42 so as to spread the discs.

In accordance with features of the present invention novel means 44 is provided for rotating the actuating discs 32 and 34 relatively to each other in order to energize the brake structure. As will become more apparent from the description below, this means is constructed so as to have improved ruggedness and an increased useful working life while at the same time the means 44 provides for smoother and more efficient operation and is economical to produce.

The actuating means 44 comprises ears 46 and 48 integral with and extending radially from the actuating or wedge element 50 is disposed between the ears 46 and 48. Substantially identical but oppositely disposed elongated and inclined ball seats or cam surfaces 52 and 54 are formed in opposing sides of the ear 46 and the wedge element 50. Similar substantially identical but oppositely disposed cam seats or ball surfaces 56 and 58 are formed in opposing sides of the ear 48 and the wedge element 50. A ball member 60 is disposed between the cam surfaces 52 and 54, and an identical ball member 62 is disposed between the cam surfaces 56 and 58. As shown best in FIG. 4 the cam surfaces 52—54 and 56—58 are inclined with respect to a radius of the actuating discs which bisects the wedge or cam element 50. Thus upon radial movement of the cam element the ball members 60 and 62 will ride up on the cam surfaces associated therewith so as to force the ears 46 and 48 away from each other and thereby cause relative rotation of the actuating discs for energizing the brake structure.

In this embodiment, the cam surfaces 52—54 and 56—58 are formed so that the brake will be energized when the wedge element 50 is pulled radially outwardly. However it is to be understood that these cam surfaces may alternatively be formed so that the brake will be energized when the wedge element is shifted radially inwardly or in any other desired direction between the ears 46 and 48.

It is further to be noted that the ball elements 60 and 62 eliminates substantially all sliding friction between the actuating element 50 and the actuating discs so that more efficient and smoother operation of the structure is promoted. Furthermore it has been found that the ball elements 60 and 62 and their associated cam surfaces or ball seats are capable of being produced relatively economically and are capable of transmitting relatively high forces without injury or undue wear thereto.

It will be appreciated that as the actuating element 50 and the balls 60 and 62 move radially outwardly during operation of the brake structure, the mechanical advantage provided by the actuating means 44 tends to increase. If desired, the structure may be formed so that this mechanical advantage remains substantially constant by curving either the cam surfaces on the ears 46 and 48 or the cam surfaces of the element 50 or both. In this embodiment the cam surfaces 54 and 58 on the element 50 are curved along their length as shown best in FIG. 4. The radius of this curvature is of course, related to the length of the effective lever arms provided by the ears 46 and 48 so as to obtain the desired control or variation of the mechanical advantage.

When the actuating discs rotate relatively to each other they also shift axially relative to each other as a result the action of the balls 38 riding on the cam surfaces 40 and 42 therebetween. In order to accommodate such axial relative movement, the cam surfaces 52 and 56 are not only inclined relative to a radius of the actuating discs as shown in FIG. 4 but are also inclined relative to an imaginary plane containing the centers of the ball members 38, 60 and 62 as indicated in FIG. 5. While only the inclination of the cam surface 52 with respect to the aforementioned plane is actually shown in FIG. 5 it is to be understood that the cam surface 56 is inclined in a similar but opposite manner with respect to the plane. The arrangement is such that the centers of the ball elements 60 and 62 always remain in the plane containing the centers of the ball elements 38 as the actuating discs are rotated and axially shifted relative to each other.

In the embodiment shown in FIGS. 1–6 the wedge element 50 is connected to or integrally formed with a rod 64 which in turn is connected to an actuating lever 66 in the manner shown in FIG. 1. The lever 66 is pivoted as at 68 to a suitable bracket 70. The lever 66 may be operated manually or with the aid of suitable power means, not shown, for pulling the wedge element outwardly and thereby energizing the brake structure.

In order to transmit the braking torque between the discs 32 and 34 and the housing members 12 and 14 regardless of the direction of rotation of the shaft 60, a torque pin 72 is fixed between the housing members 12 and 14 at a point diametrically oppositely from the actuating means 44 as shown in FIGS. 1 and 3. The actuating discs 32 and 34 are provided with lugs or ears 74 and 76 respectively, which lugs which are alternatively engageable with opposite sides of the stop or torque pin 72. For example, in the event that the shaft 16 is rotating in a clockwise direction as viewed in FIG. 1 when the brake is energized, there will be a tendency for the actuating discs to rotate in the clockwise direction along with the friction discs assemblies 22 and 24, but such rotation of the actuating disc 32 arrested by engagement of the lug 74 with the stop pin 72. On the other hand, if the shaft 16 is rotating in a counterclockwise direction as viewed in FIG. 1 when the brake is energized, the lug 76 will be forced into engagement with the stop pin 72 for limiting counterclockwise rotation of the actuating disc 34. Additional lugs 78 and 80 provided on the peripheries of the actuating discs 32 and 34 respectively, which lugs are engageable with opposite sides of the pin 72. During normal operation of the brake structure, the lugs 78 and 80 will not engage the pin. However, these lugs provide positive means for limiting the amount of relative rotation which may take place between the actuating discs so as to prevent a complete failure of the brake in the event that the cam surfaces 52—54 and 56—58 and their associated ball elements become worn.

Abutments 82 and 84 are formed in the housing member 14 for slidably engaging finished peripheral surface portions of the actuating discs and combining with the stop pin 72 in centering the discs in the housing.

FIGS. 7–10 show another embodiment of the present invention which is similar to the structure described above as indicated by the application of identical reference numerals with the suffix *a* added to corresponding parts. While only a fragmentary portion of the brake unit 10*a* is shown, it is to be understood that this unit includes all of the structural features and functions of the embodiment described above with exception of the differences in the means for retaining and actuating the balls 60*a* and 62*a* which will now be described.

In this embodiment the actuating means 44*a* is simplified in that the heretofore described actuating or wedge element 50 is replaced by a cage element 50*a* having a transverse bore 86 extending entirely therethrough. The balls 60*a* and 62*a* are received and partially housed within the bore 86 in the manner shown so that they are effectively retained against escape regardless of any relative tilting which may take place between the ball retaining and actuating element 50*a* and the ears 46*a* and 48*a* of the actuating discs during operation of the brake structure.

While the balls 60*a* and 62*a* are relatively closely received by the bore 80, sufficient clearance is provided so that the balls may rotate easily relative to the side walls of the bore and to each other. As shown in FIGS. 7, 9 and 10, the balls 60*a* and 62*a* are in direct engagement with each other and serve to back each other up. Preferably a pin 88 is inserted through the bore midway between opposite ends thereof and adjacent one side thereof. The pin 88 is engageable with both of the balls 60*a* and 62*a* so as to maintain the cage member 50*a* centered with respect to the balls.

While the preferred embodiments of the present invention have been shown and described herein, it is obvious that many structural details may be changed without departing from the spirit and scope of the appended claims.

The invention is claimed as follows:

1. A brake structure comprising housing means providing friction surface means, friction disc means adjacent to and engageable with said friction surface means, said housing means and said friction disc means being relatively rotatable with respect to each other, a pair of axially shiftable actuating discs disposed adjacent said friction disc means, means between said actuating discs for axially shifting said discs for urging said friction disc means against said friction surface means when said actuating discs are rotated relative to each other, and means for relatively rotating said actuating discs for energizing the brake structure, said last named means including a pair of generally radially extending ears respectively on said discs and disposed in opposing relationship, said ears respectively including generally radially extending and elongated ball seats, shiftable actuating means disposed between said ears and including a pair of ball bearing elements respectively engaging said seats for transmitting forces between said actuating means and said ears during operation of the brake structure, said seats being substantially equally oppositely inclined toward each other and relative to a plane disposed between said discs for maintaining said ball bearing elements substantially centered with respect to said plane during relative movement of the discs, and said actuating means including means for retaining said ball bearing elements and operable for rolling the ball bearing elements along said ball seats.

2. A brake structure, as defined in claim 1, wherein said elongated ball seats are oppositely inclined with respect to a radius of said actuating discs and are disposed for maintaining a substantially constant mechanical advantage during movement of the ball bearing elements along the seats.

3. A brake structure, as defined in claim 1, wherein said means for retaining said ball bearing elements comprises a wedge member disposed between said elements and between said ball seats.

4. A brake structure, as defined in claim 1, wherein said means for retaining said ball bearing elements comprises a cage member having an opening therethrough partially receiving and housing said elements, said elements being in engagement with each other, and means on said cage means and engageable with said elements for maintaining said cage means in substantially centered relationship to said elements.

5. A brake structure comprising housing means providing friction surface means, friction disc means adjacent to and engageable with said friction surface means, said housing means and said friction disc means being relatively rotatable with respect to each other, a pair of relatively axially shiftable actuating discs disposed adjacent said friction disc means, means between said actuating discs for relatively axially shifting said discs for urging said friction disc means against said friction surface means when said actuating discs are rotated relative to each other, and means for relatively rotating said actuating discs for energizing the brake structure, said last named means including a pair of generally radially extending ears respectively on said discs and disposed in opposing relationship, said ears respectively including generally radially extending and elongated ball accommodating grooves, shiftable actuating means disposed between said ears and including a pair of ball bearing elements respectively engaging said grooves for transmitting forces between said actuating means and said ears during operation of the brake structure with said grooves being relatively inclined toward one another with respect to a plane disposed between said discs for maintaining said ball bearing elements in engagement with said grooves during relative axial movement of the discs, and said actuating means including means for retaining said ball bearing elements and operable for rolling the ball bearing elements along said grooves.

References Cited in the file of this patent

UNITED STATES PATENTS

| | | |
|---|---|---|
| 2,883,008 | Lucker | Apr. 21, 1959 |
| 2,983,338 | Vansteenkiste | May 9, 1961 |

FOREIGN PATENTS

| | | |
|---|---|---|
| 599,541 | Great Britain | Mar. 15, 1948 |
| 317,603 | Switzerland | Jan. 4, 1954 |

UNITED STATES PATENT OFFICE
CERTIFICATE OF CORRECTION

Patent No. 3,106,990             October 15, 1963

Osborn A. Kershner

It is hereby certified that error appears in the above numbered patent requiring correction and that the said Letters Patent should read as corrected below.

Column 2, line 53, after "extending" insert -- generally --; same line 53, after "actuating" insert -- discs 32 and 34 respectively. An actuating --.

Signed and sealed this 31st day of March 1964.

(SEAL)
Attest:

ERNEST W. SWIDER

Attesting Officer

EDWARD J. BRENNER

Commissioner of Patents